June 22, 1965  R. W. TRIPP ETAL  3,191,010
ANALOG-DIGITAL CONVERTER
Filed Sept. 7, 1962  12 Sheets-Sheet 1

INVENTORS
ROBERT W. TRIPP
ROBERT Z. GELLER
BY W. E. Beatty
ATTORNEY

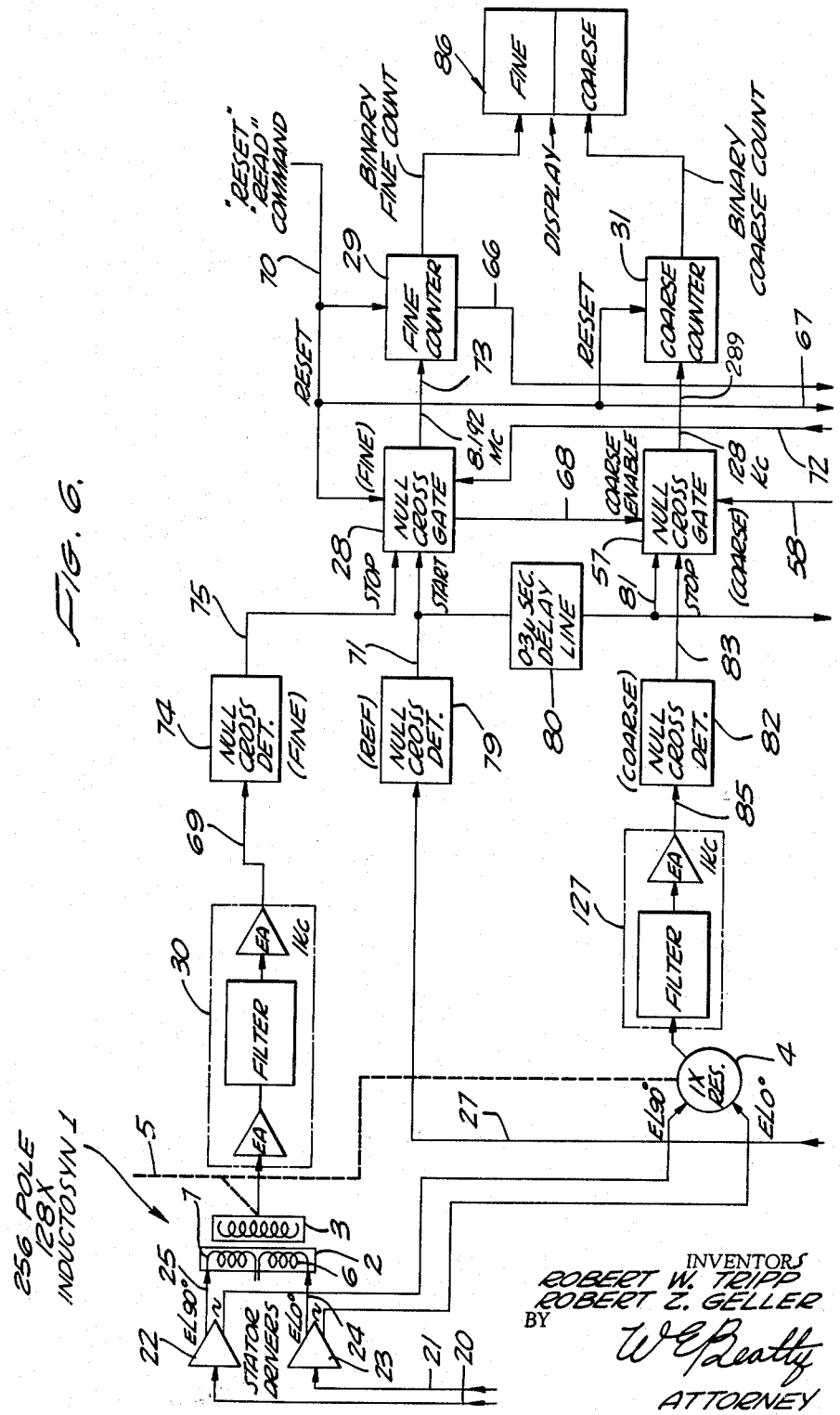

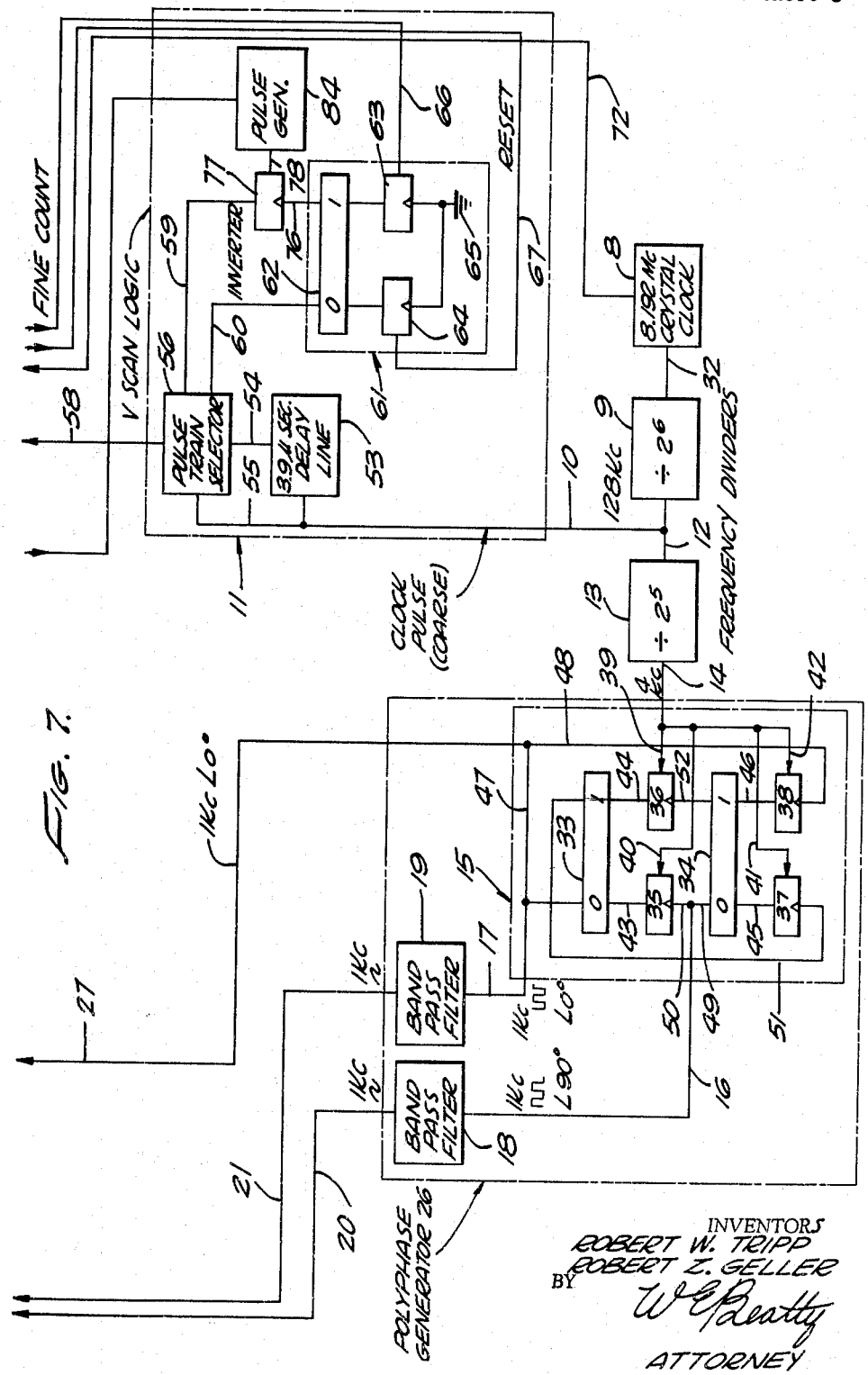

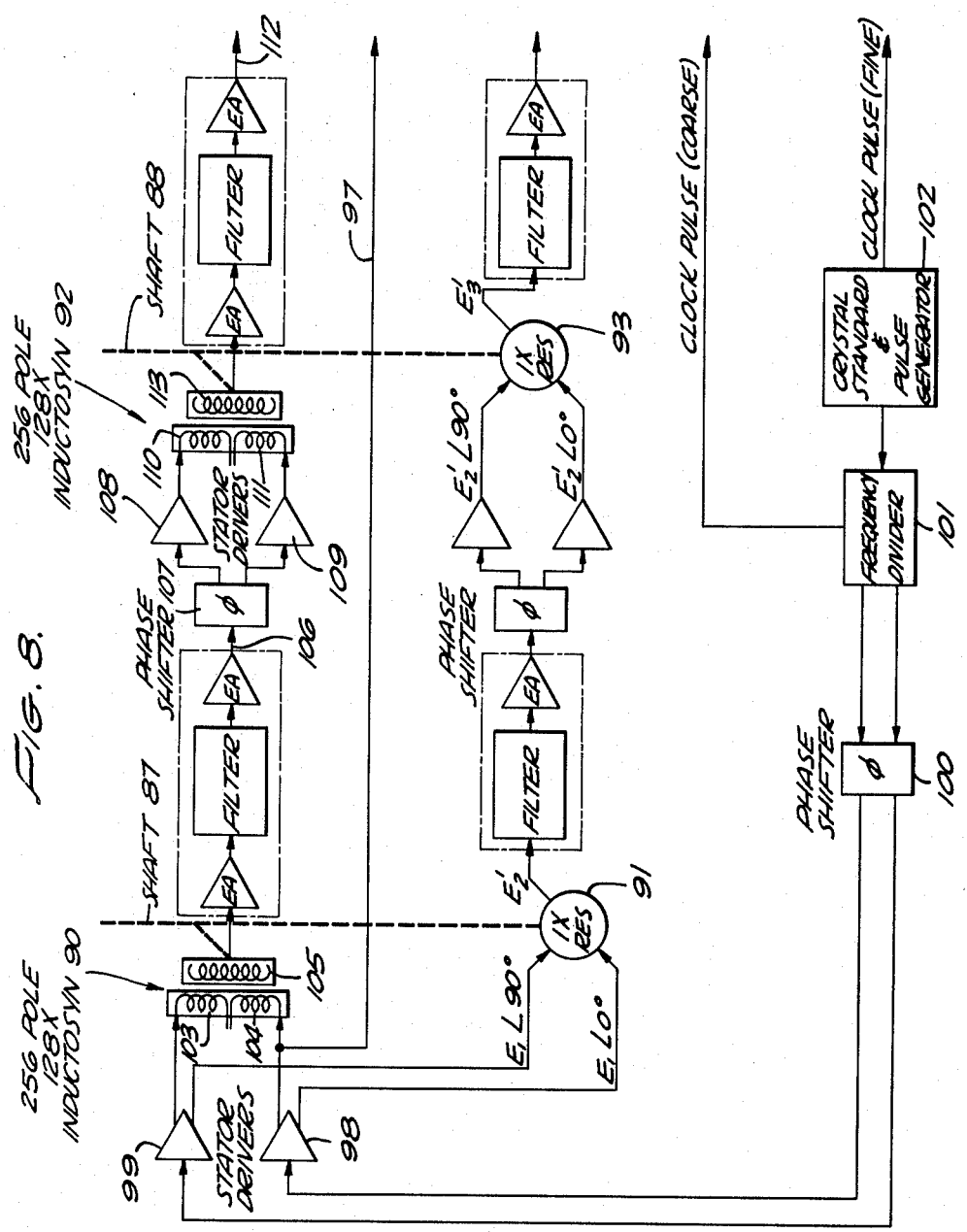

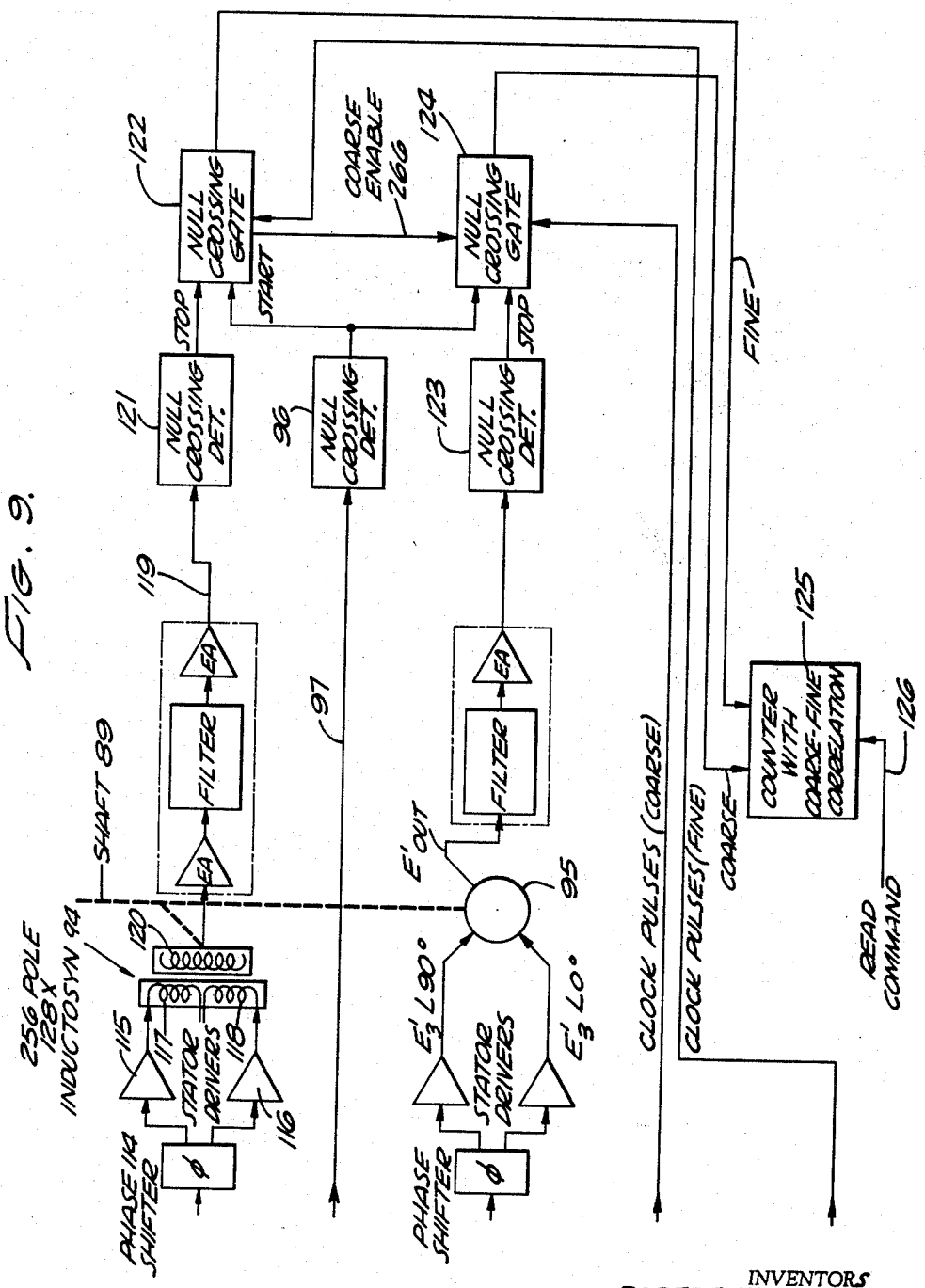

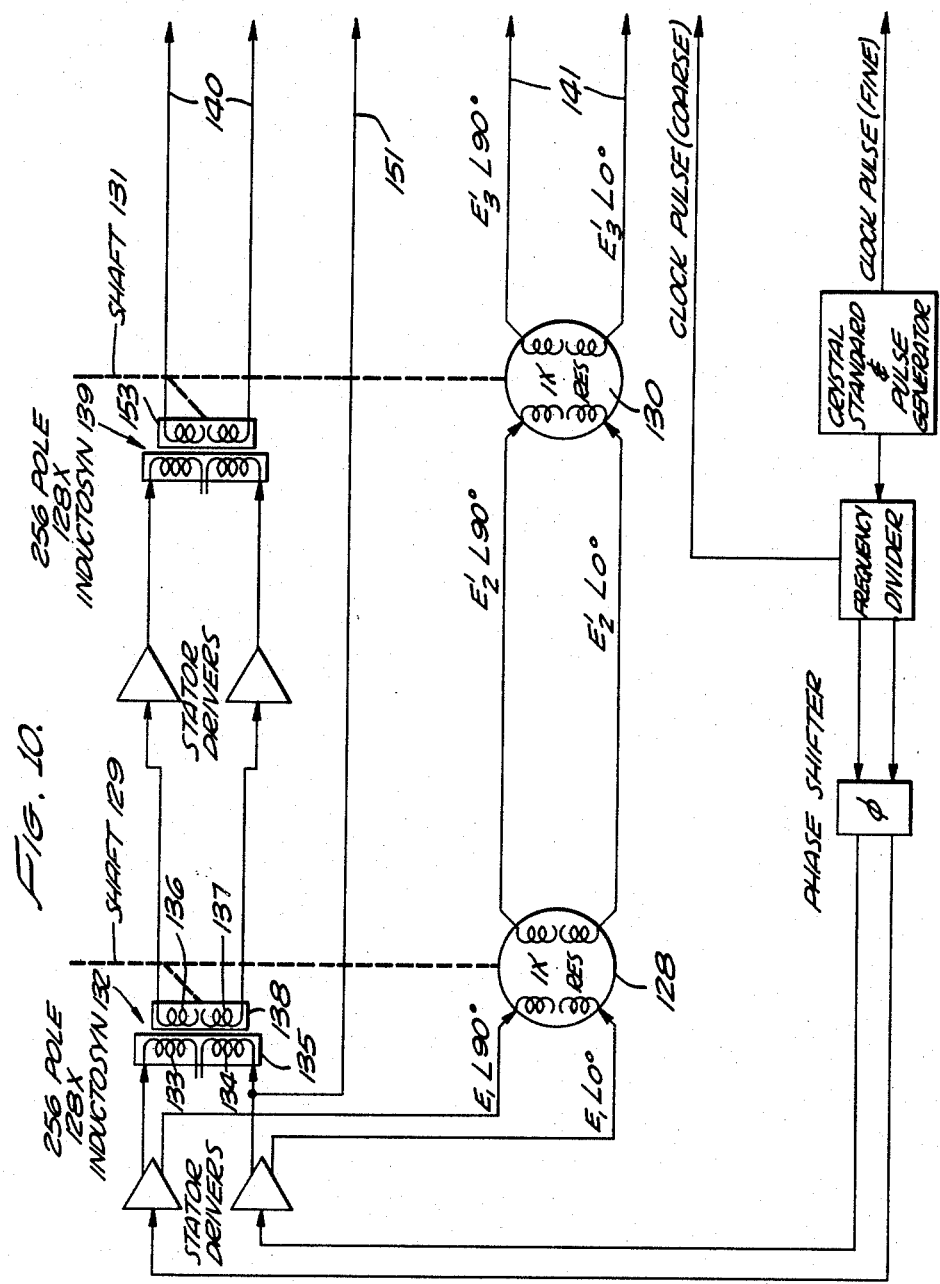

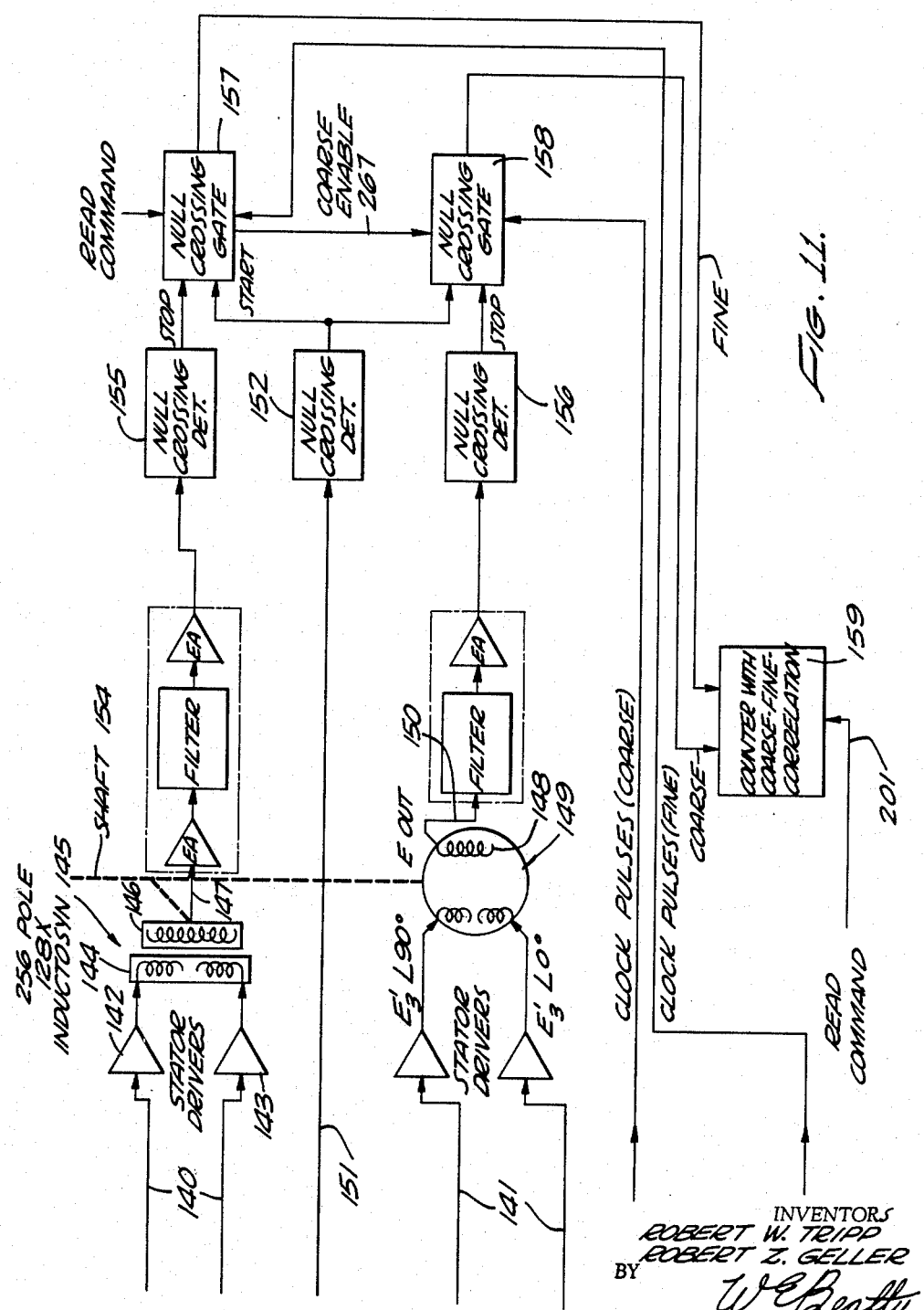

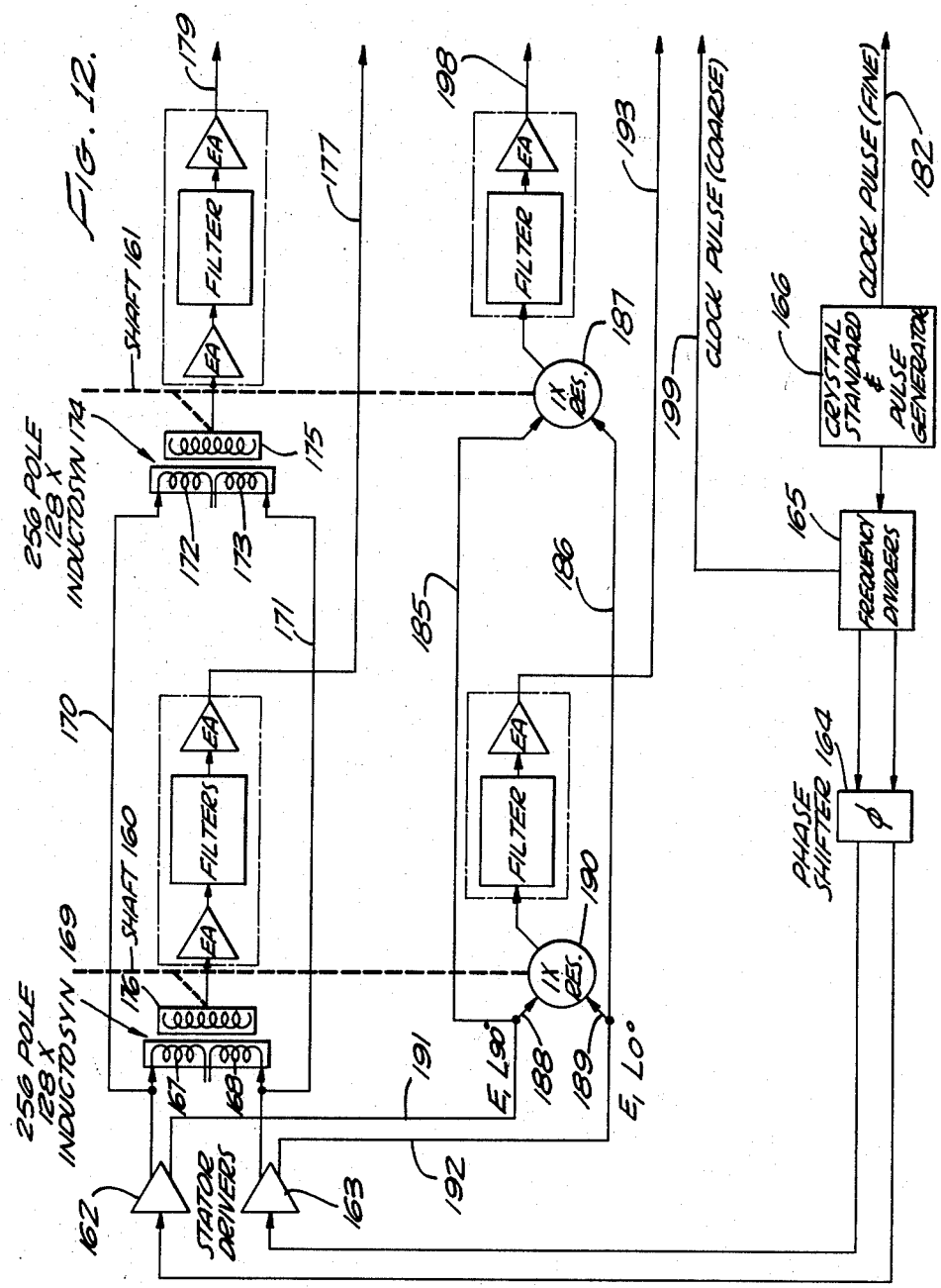

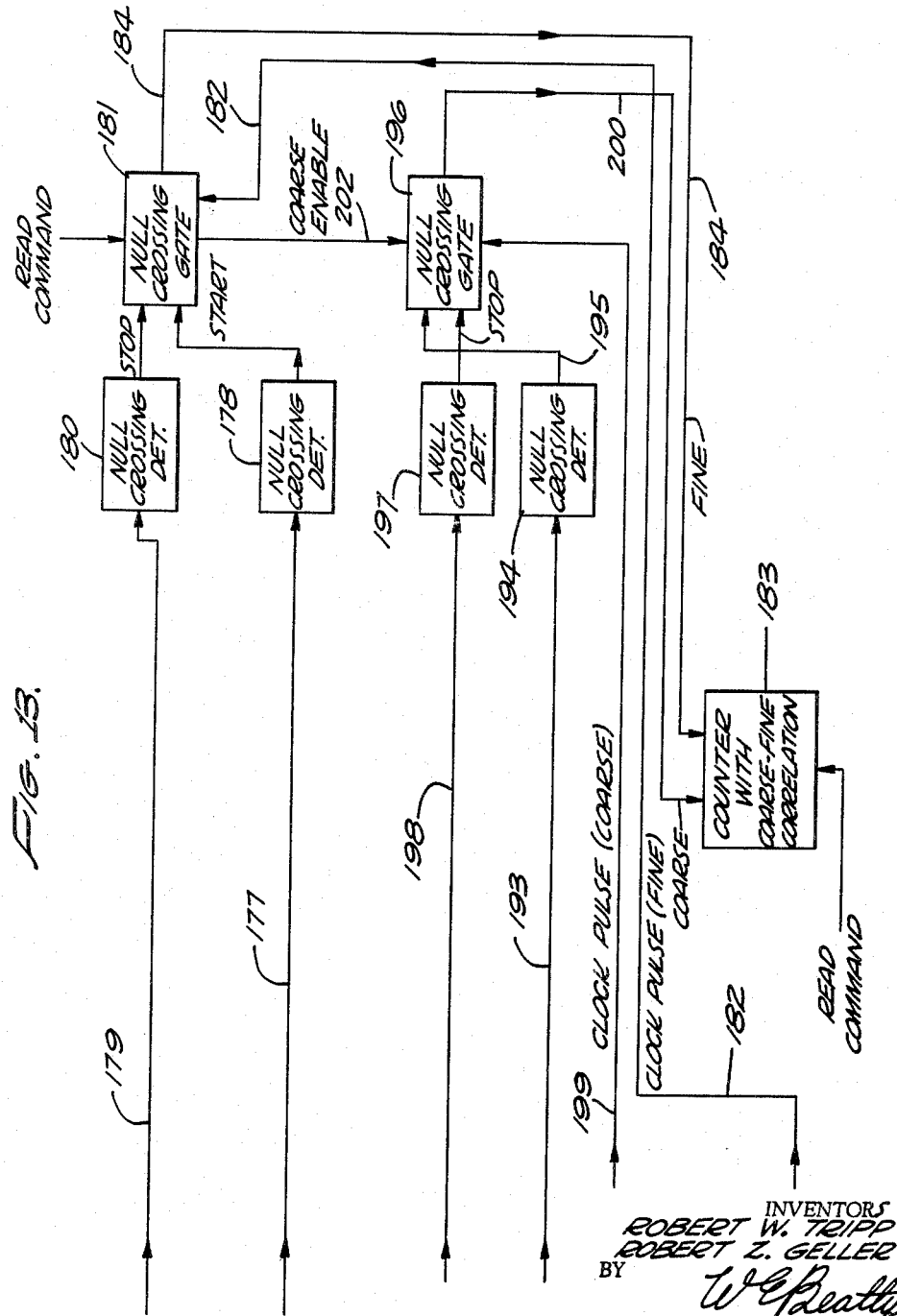

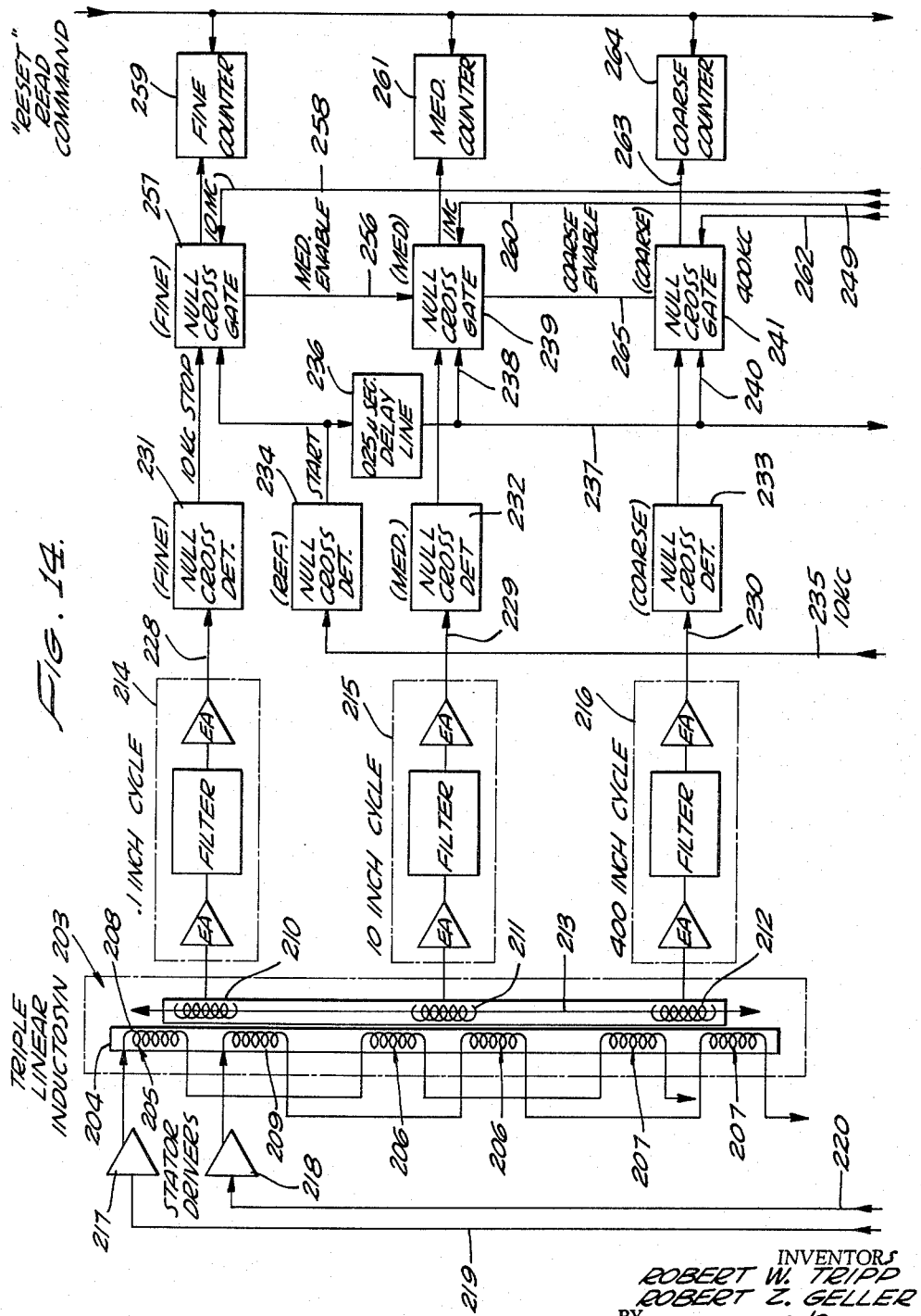

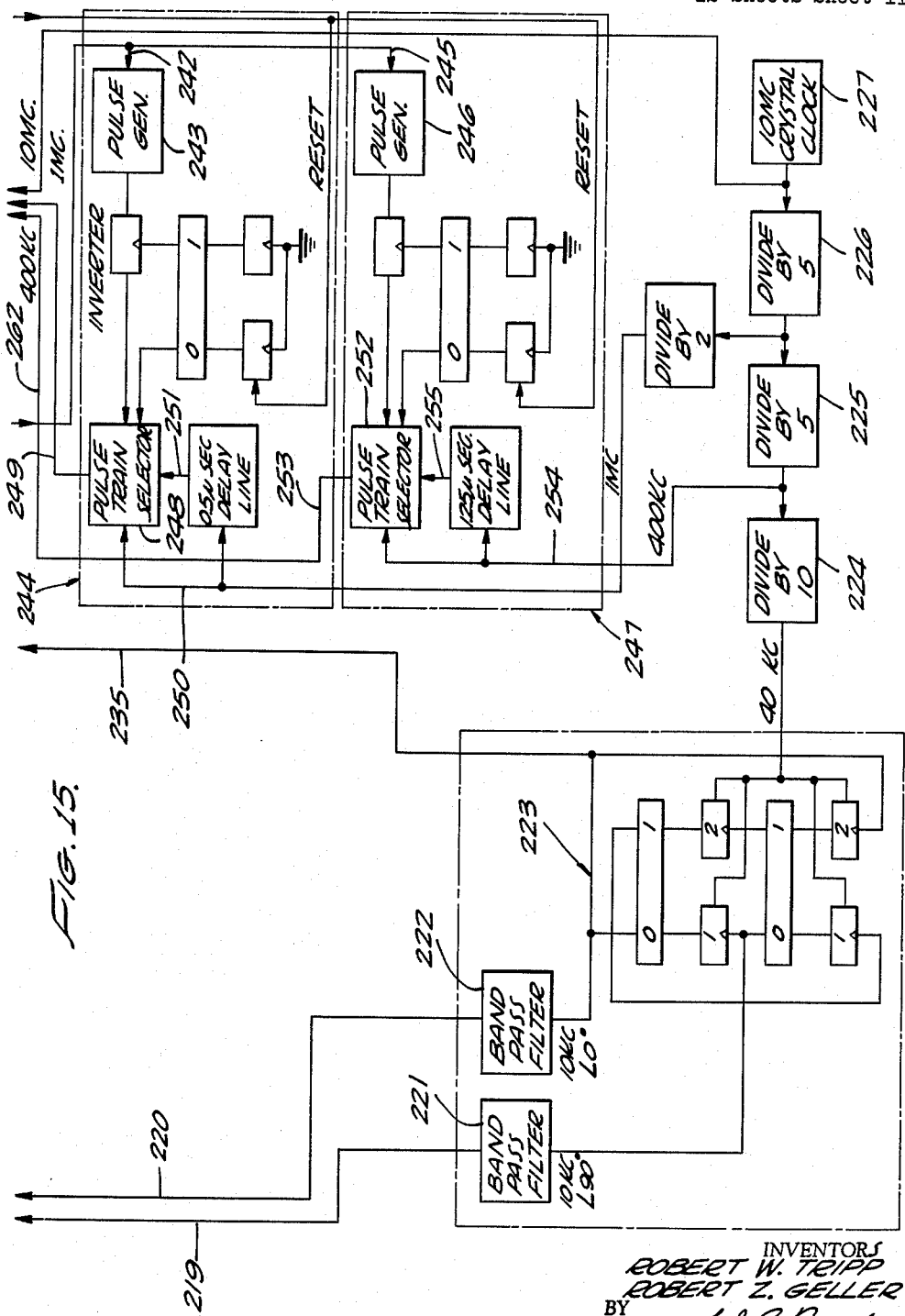

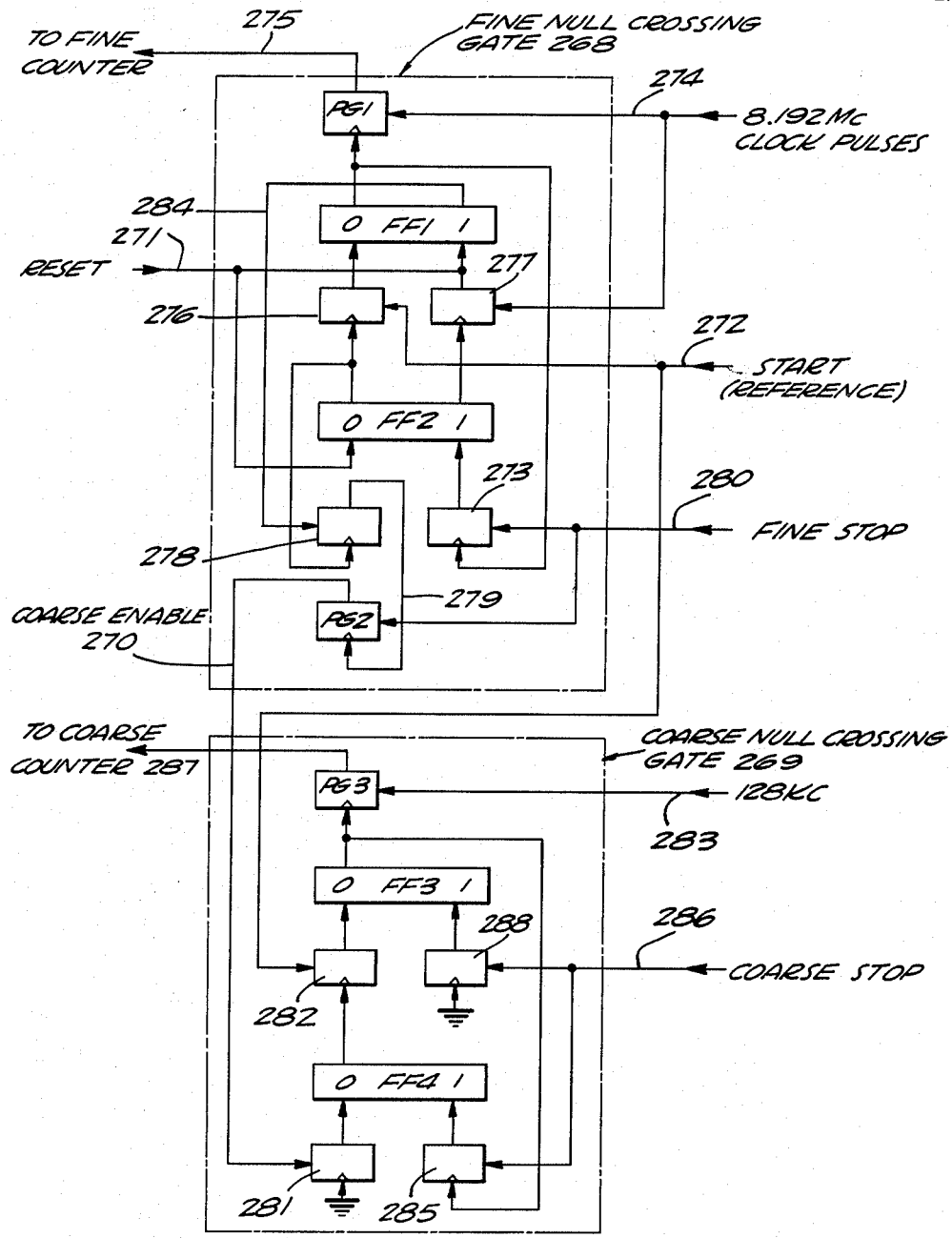

United States Patent Office 3,191,010
Patented June 22, 1965

3,191,010
ANALOG-DIGITAL CONVERTER
Robert W. Tripp, Eastchester, and Robert Z. Geller, Wantagh, N.Y., assignors to Inductosyn Corporation, Carson City, Nev., a corporation of Nevada
Filed Sept. 7, 1962, Ser. No. 222,151
13 Claims. (Cl. 235—155)

The invention relates to an analog-to-digital converter, and more particularly to a converter employing coarse and fine data transmission elements in the form of position measuring transformers having relatively movable members, one of the members having polyphase windings, the other having a single phase winding. The polyphase windings constitute the input and are relatively stationary, whereas the single phase windings are relatively movable and are driven by the shaft or linear drive and provide a phase sensitive control signal.

An object of the invention is to maintain synchronism of the phases with each other and with reference signals employed to control a null crossing detector and null crossing gates, and also employed for correlating the operation of coarse and fine counters to prevent an ambiguity in the count. This is accomplished by deriving the reference signals, as well as the polyphase inputs for the data transmission elements, from the same source which is a crystal controlled oscillator generating a clock frequency. The lower frequencies required are obtained by frequency division. The polyphase input for the data transmission elements, for example, is shown as two phases of a carrier with precisely 90 degrees of phase shift between them. This polyphase input is obtained by quadrature generation and division of the clock frequency.

By counting down from the clock pulse generator, this removes a one count uncertainty that would exist if the carrier and clock frequencies were not synchronized, and a precise phase relation is obtained between the polyphase inputs.

In the example shown, there is provided a binary system wherein a 256 pole (128 speed) rotary Inductosyn *

* Trademark.

and a one speed resolver are mounted on a shaft whereof the shaft position is to be measured or indicated by a binary digital number. The stator windings of the Inductosyn are energized with a polyphase one kc. sine wave source, as explained above, the Inductosyn rotor having a signal or error output of constant amplitude one kc. sine wave the phase of which varies as a function of the shaft angle position. A 360° shift in phase is realized for each electrical cycle of the Inductosyn. Since the Inductosyn has 256 poles, the cycle is 1/128 of a revolution or 2$13/16$ degrees of shaft rotation. For a count of $2^{20}$, the fine electrical cycle is divided into $2^{13}$ or 8,192 fine parts, the coarse resolver which defines the Inductosyn cycle, providing the additional count of $2^7$. With a carrier of 1 kc. the required clock pulse frequency is therefore 8.192 mc. The total number of pulses fed from the clock to the coarse and fine counter is a digital representation of the phase shift existing between a reference crossing and the error crossing of the output signals from the data transmission elements and therefore, a direct measurement of the angle of the shaft has provided the phase shift. Similar considerations apply in the case where data transmission elements have a linear instead of rotary movement.

A further object of the invention is to correlate the operation of the coarse and fine counters. In accordance with this object, the invention provides so-called "V scan logic" circuitry having a pulse train selector supplying two trains of pulses of the same frequency, derived from the clock oscillator, one an early or lead train and the other a late or lag train, the latter being phase shifted by ½ the pulse spacing or 3.9 μsec. with respect to the early train. This delay is equal to approximately ½ cycle of the coarse frequency. After any reset pulse, the pulse train selector will always transmit the early pulse train to a coarse null crossing gate, but this gate is in an off condition and does not transmit until put in a ready condition by the fine null crossing gate after the fine counter has completed its count. At the initiation of a set read command, the fine counter is reset to zero, the fine null crossing gate accepting the next start pulse and opening to transmit the 8.192 megacycles pulses from the clock generator to the fine counter. The fine counter counts these pulses until the next stop command is received.

More particularly, a further object of the invention is to correlate the operation of the coarse and fine counter by feeding to the coarse counter either the early or late pulse train, depending upon the count registered in the fine counter. This is accomplished by the V scan logic circuitry which transmits the early pulse train to the coarse counter if the fine counter has not gone over half its total possible count, and which transmits the late pulse train to the coarse counter if the fine counter has gone over half its total possible count.

A further object of the invention is to remove the ambiguity which exists in the V scan logic circuitry below the first 2$13/16$ degrees of shaft revolution which is equivalent to one complete Inductosyn cycle. This is accomplished by providing a delay which shifts the coarse stop pulse from synchronism with either the early or late pulse train. This delay is adjusted so that the consecutive pulses of the early pulse train lie near the negative peak of the reference signal to the Inductosyn, and, therefore, the late pulses lie near the positive peak of the reference signal to the Inductosyn. Thus, the switch point of the pulse train selector in the V scan circuitry occurs midway between the early and late pulse train spacing.

The coarse resolver and the Inductosyn are mechanically and electrically zeroed. Therefore coarse and fine error null crossings will occur approximately in synchronism, within the accuracy of the coarse resolver. However, the fine error null crossing selects a train of pulses, through V scan logic, which places the coarse stop pulse in a position so that it never can be synchronous with a pulse in the coarse early or late trains. Thus the fine counter or fine portion of the system removes the ambiguity which could possibly exist in the coarse count and automatically selects the pulse train which has the correct number of pulses for the coarse count.

A further object of the invention is to digitize the sum and/or difference of several shaft angles. The invention accomplishes this while employing no more digital equipment than is required for a single shaft angle digitizing system.

A further object of the invention is to provide a phase analog system for linear position digitizing. The invention illustrates how this may be accomplished by the use of the standard linear Inductosyn and gear train coupled resolvers or by the use of the linear triple Inductosyn. The standard Inductosyn is disclosed and claimed in U.S. Patent 2,799,835, patented July 16, 1957, to R. W. Tripp et al., for Position Measuring Transformer, and in numerous other U.S. patents assigned to the same assignee. The triple Inductosyn is disclosed and claimed in copending application S.N. 29,972 filed May 18, 1960, by Clair L. Farrand and Robert W. Tripp for Precision Transducers.

For further details of the invention, reference may be made to the drawings wherein FIG. 1 is a block diagram showing how FIGS. 6 and 7 fit together to make an analog-to-digital converter according to the present invention.

Figure 4:
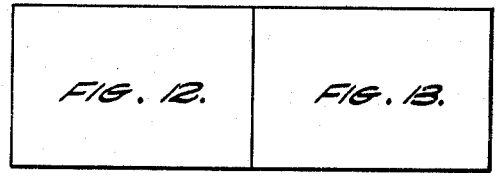

FIG. 4 is a block diagram showing how FIGS. 12 and 13 fit together for multiple shaft encoding, showing a parallel arrangement for the sum and difference of the positions of two shafts rather than the tandem arrangement of the system of FIGS. 8 and 9 and its simplified form in FIGS. 10 and 11.

Figure 5:
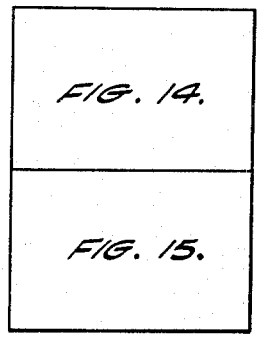

FIG. 5 is a block diagram showing how FIGS. 14 and 15 fit together to provide a system similar to that shown in FIGS. 6 and 7 for a single shaft, and wherein the Inductosyn and resolver of FIGS. 6 and 7 are replaced by a 3 speed or triple Industosyn of linear form instead of the rotary form in FIGS. 6 and 7.

FIG. 16 is a schematic circuit of the fine and coarse null crossing gates with coarse enable.

Referring in detail to the drawings, FIGS. 6 and 7 illustrate a binary system wherein a 256 pole, 128 speed rotary Inductosyn 1 has a stator 2 and rotor 3. The rotor 3 and the rotor of a 1 speed coarse resolver 4 are mounted on the shaft 5, indicated by broken lines. The reference number 5 identifies the shaft of which the position is to be measured or displayed as described.

The stator windings 6 and 7 of Inductosyn 1 are energized with 1 kc. voltages in quadrature time phase relation, these voltages being derived from a crystal clock generator 8 which also supplies all the basic frequencies required for system operation.

For reasons explained below, the frequency of clock 8 is 8.192 mc. Frequency divider 9 divides this frequency by $2^6$, the output 128 kc. which is the coarse clock pulse being supplied by line 10 to the V scan logic circuitry 11, and also by line 12 to frequency divider 13 for a further division by $2^5$, the output of 4 kc. as indicated being supplied by line 14 to the frequency divider and quadrature generator 15 having 1 kc. square wave outputs on lines 16 and 17, one of the outputs being shifted in time phase 90° relative to the other. The voltages in lines 16 and 17 are supplied to band pass filters 18 and 19 which supply their output to lines 20 and 21 which lead to the stator driver amplifiers 22 and 23. The frequency divider and quadrature generator 15 and band pass filters 18 and 19 constitute a polyphase generator indicated at 26 for the polyphase voltages on lines 20 and 21, and for the 1 kc. square wave coarse reference signal on line 27. Driver 23 has an output on line 24 to stator winding 6, and driver 22 has an output on line 25 to stator winding 7.

The signal or error output from the Inductosyn rotor 3 is a constant amplitude one kilocycle sine wave the phase of which varies as a function of the angles of shaft 5. As a result, a 360° shift in phase is realized for each electrical cycle of the Inductosyn 1. Since the Inductosyn 1 has 256 poles, the cycle is 1/128 of a revolution or 2 13/16 degrees of shaft 5 rotation. For a total count of $2^{20}$ the electrical cycle is divided into $2^{13}$ or 8.192 mc. parts. The coarse resolver 4 will define the Inductosyn cycle thereby providing the additional count of $2^7$. With a carrier frequency of 1 kc., the required clock pulse frequency is therefore 8.192 mc. The 1 kc. carrier is derived by counting down from the clock pulse generator 8 as explained above. This removes a one count uncertainty that would exist if the carrier and clock frequencies were not synchronized. It also provides a convenient means for obtaining two phases of a highly stable carrier with precisely 90° of phase shift between them.

Positive going null crossings of the 0° reference square wave on line 27 open the fine null crossing gates 28, allowing pulses from the clock pulse generator to be fed to the fine counter 29. The null crossing gate 28 is closed by positive going null crossings of the Inductosyn output signal from rotor 3 in line 69, after transmission through the amplifiers and filter indicated by block 30, thus blocking clock pulses to the fine counter 29.

The total number of fine pulses fed from the clock 8 to the counter 29 is therefore a digital representation of the phase shift existing between the square wave reference crossing in line 27 and the positive error crossing of the output signal in line 69 and, hence, the pulse count is a direct measurement of the angle of the shaft 5 that provided the phase shift.

The same procedure applies to the 1 speed resolver 4 provided for coarse digital data consisting of the 128 kc. pulses in line 10 which are counted by the coarse counter 31.

The 1 speed resolver 4 is operated exactly in the same fashion as the circuit of Inductosyn 1 described above, taking full consideration of the fact that this 1 speed circuit counts parts of one revolution (360°), whereas the Inductosyn counts parts of 1/128 of a revolution (2 13/16 degrees). The frequency of operation of the coarse or 1 speed section of the counter is 128 kc., and is obtained by frequency division in the same method as fine, as explained above.

*Digital system operation*

Figure 1:
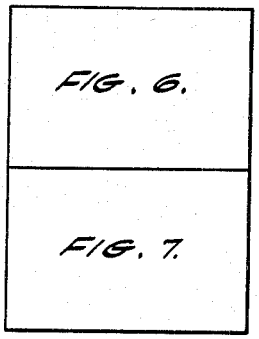
Figure 2:
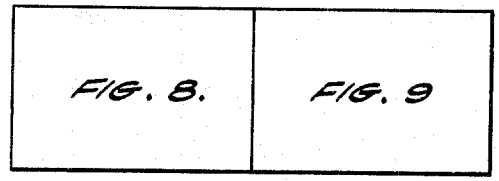
FIG. 2 is a block diagram showing how FIGS. 8 and 9 fit together to form the invention applied to multiple shaft encoding.
Figure 3:
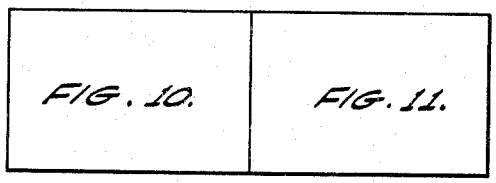
FIG. 3 is a block diagram showing how FIGS. 10 and 11 fit together to provide for multiple shaft encoding wherein the circuit is simplified by the use of 4 pole resolvers, whereby filters, error amplifiers, and phase shifters are omitted as unnecessary.

Referring to FIGS. 1 and 2, system digital operation is as follows: using the 256 pole rotary Inductosyn, with 1 kc. excitation and a clock frequency of 8.192 megacycles, a total count of $2^{20}$ for each 360° of shaft rotation will result. This will consist of a count of $2^{13}$ in fine and a count of $2^7$ for the coarse resolver 4. The data output will be in a parallel binary form. The 1 kc. stator excitation lines 20 and 21 and the 128 kc. coarse clock frequency lines 10 and 12 are obtained by frequency division of the 8.192 mc. crystal controlled clock 8 on the diagram. The 8.192 mc. pulses are fed via line 32 to the first divider 9. Divider 9 contains six flip flops which divide the 8.192 mc. by $2^6$ or 64. The output of this divider in lines 10 and 12 is a pulse train with a frequency of 128 kc. The 128 kc. train is fed to the second frequency divider 13 via line 12 and to the V scan logic circuitry 11 via line 10. The second divider 13 contains five flip flops, these flip flops divide the 128 kc. train by $2^5$ or 32. The output of divider 13 in line 14 is therefore a pulse train at a frequency of 4 kc. This 4 kc. pulse train is fed via line 14 to the frequency divider and quadrature generator 15. The quadrature generator and divider 15 contains two flips flops 33 and 34 and four pulse inverters 35, 36, 37, and 38. The 4 kc. output of divider 13 is applied simultaneously to the inputs of the four pulse inverters 35–38 via lines 39, 40, 41, and 42. The pulse inverters 35–38 will not pass a pulse unless their gate inputs, as indicated by the small triangles on each inverter, are at ground. The two flip flops 33 and 34 provide a ground at their 0 to 1 terminals when they are in the 0 or 1 state. If flip flop 33 is in the 0 state then its 0 output terminal is at ground and its 1 terminal is at −4 volts. The same logic applies to flip flop 34. The output of the pulse inverters 35–38 is applied to the flip flop inputs via lines 43, 44, 45, and 46. If a pulse is applied to the 0 input of a flip flop and it is in the zero state it will not transfer, however, if it is in the 1 state it will transfer. Having defined operation of the individual components of the frequency divider and quadrature generator 15, quadrature generation and division proceed as follows.

Assume both flip flops 33 and 34 to be in the zero state. Therefore, their 0 output terminals are at ground. The ground of flip flop 33 is applied via lines 47, 48 to pulse inverter 38 and from flip flop 34 via lines 49, 50 to pulse inverter 35. Likewise the flip flop 33 one terminals are at ground. A flip flop in the zero state has a ground at its zero terminal and −4 volts at its one terminal. The −4 volt levels are applied to pulse inverters 36 and 37 via lines 51 and 52. Under this condition, pulse inverters 35 and 38 will transmit the first pulse of the 4 kc. train which appears at their inputs. Since flip flop 33 is in the zero state, it will ignore this pulse. However flip flop 34 will transfer to the 1 state since it is receiving a transfer pulse on the 1 side and is in the zero state. On the second 4 kc. pulse, flip flop 33 is still in the zero state and flip flop 34 is now in the 1 state. Grounds therefore appear on pulse inverter gates 36 and 38. Therefore, pulse inverters 36 and 38 now transmit the second pulse to the 1 inputs of the flip flops 33, 34. Since flip flop 33 is in the zero state it transfers and since flip flop 34 is in the 1 state it does not transfer. Now both flip flops 33, 34 are in the 1 state. Grounds therefore appear at pulse inverters 36 and 37. On the third pulse of the 4 kc. train, flip flop 34 transfers and flip flop 33 does not. Now flip flop 33 is in the 1 state and flip flop 34 is in the zero state. Grounds now appear at pulse inverters 35 and 37. On the 4th pulse of the 4 kc. train, flip flop 33 transfers and 34 does not. Now both flip flops 33, 34 are in the zero state and we are back at the starting condition. Regardless of the state of the flip flops 33, 34 at the start of a count, they will return to this state within 4 pulses of the applied frequency, therefore a scale of 4 is developed and if the input frequency is 4 kc. the output frequency will be 1 kc. Since the flip flops 33, 34 transfer alternately at every pulse of the 4 kc. train, their 0 or 1 output terminals are always precisely 90° phase shifted with respect to each other and are always in synchronism with the applied frequency. Thus the outputs of polyphase generator 26 on lines 20 and 21 are quadrature 1 kc. square waves. The harmonics in the square waves from quadrature generator 15 are filtered out by filters 18 and 19 and the filter outputs on lines 20 and 21 are sine waves with the same time phase characteristics of the input square waves; that is 90°. The quadrature sine waves are fed via lines 20 and 21 to the stator driver amplifiers 22, 23.

*V scan logic circuitry*

The V scan logic circuitry provides two trains of pulses of the same frequency which are used in coarse=fine data correlation. These pulse trains will be referred to as the early or lead train and the late or lag train. The late train is phase shifted by ½ the pulse spacing or 3.9 μsec. with repsect to the early train. This spacing is accomplished by the use of delay line 53 whose input is the early train line 55 and whose output is the late train line 54. The delay is equal to approximately ½ cycle of the coarse frequency which is 3.9 μsec.

$$\left(1/2 \text{ cycle} = \frac{1}{256,000} \text{ sec.}\right)$$

Both the early and late trains lines 55 and 54 are fed to the pulse train selector 56 which transmits either the early or late train to the coarse null crossing gate 57 in FIG. 6 via line 58. The output of the pulse train selector 56 is controlled by the voltage which appears on lines 59 and 60 at the input of pulse train selector 56. A minus 4 volt level on line 60 will block transmission of the early pulse train on line 55 through the pulse train selector 56. Likewise, a minus 4 volt level on line 59 will block transmission of the late pulse train on line 54. When a ground potential occurs at either line 59 or 60 the pulse mixer will transmit pulses on that side which sees the ground. In this way, either the early or the late train is transmitted via the train selector 56 through line 58 to the coarse null crossing gate 57. The zero or minus 4 volt level for lines 59 and 60 are supplied by the flip flop circuitry 61 in FIG. 7. Depending on the state of the flip flop 62, the zero or one terminals will have ground or minus 4 volts at their outputs. The flip flop state is controlled by the pulse inverters 63 and 64 in circuit 61. The pulse inverters 63 and 64 have their gate inputs returned to ground 65 and therefore can accept pulses on either line 66 or line 67 and transmit these pulses to control the state of the flip flop 62. At the beginning of a reading, a pulse appears on line 67 due to the reset start pulse. This pulse is transmitted by inverter 64 and resets the flip flop 62 to the zero state, thereby providing a ground at the zero output terminal of 62. This ground is transmitted via line 60 to the early pulse train gate input of the pulse train selector 56. This sets the pulse train selector 56 in a state wherein it will transmit the early pulse train. After any reset pulse on line 67, the pulse train selector 56 will always be transmitting the early pulse train to the coarse null crossing gate 57. However, this gate 57 is in an off condition and the coarse counter 31 does not register. The coarse null crossing gate 57 is put in a ready condition by the coarse enable line 68. The coarse enable control in line 68 is derived from the fine null crossing gate 28. After the fine counter 29 has completed its count, a pulse is transmitted via line 68 to the coarse null crossing gate 57 enabling it to accept the next start pulse and start the coarse count. Line 55 connects the outputs of the fine couner 29 to inverter 63. At the initiation of a reset read command signal on line 70, FIG. 6, the fine counter 29 is reset to zero and the fine null crossing gate 28 is put in a state where it will accept the next start pulse line 71 from null crossing detector 79. The fine null crossing gate 28 is thus opened and the 8.192 megacycles pulses from the crystal clock 8 are transmitted via line 72 through the fine null crossing gate 28 and thence via line 73 to the fine counter 29. The fine counter 29 indexes these pulses until the next stop command is received. This stop command is derived from the fine null crossing detector 74 via line 75. This stops the fine counter 29. If the fine counter 29 goes over half its total count a level is derived from line 66 to inverter 63 which sets flip flop 62 in the one state. This level is transmitted via line 76 to inverter gate 77. Inverter gate 77 is in the conducting state since its input line 78 is at a minus voltage. This level is transmitted via line 59 to the late input side of pulse train selector 56. Therefore, the pulse train selector 56 transmits the late train of pulses to the coarse null crossing gate 57. At the next null crossing of the 1 kc. reference wave, a pulse is derived from the reference null crossing detector 79 and is fed via line 71 through delay line 80 and line 81 to the coarse null crossing gate 57. This opens the coarse gate 57 and allows the late pulse train to flow through the null crossing gate 57 via line 81 to the coarse counter 31. At the next coarse error null crossing in line 27, a pulse is produced by the coarse null crossing detector 82 which is applied via line 83 to the coarse null crossing gate 57. This closes the coarse null crossing gate 57, thus blocking flow of coarse pulses to the coarse counter 31. At this point, the fine and coarse counts are now locked up in their respective counters 29 and 31. These counters will retain this information until another read set command is applied via line 70. If the fine counter 29 had not gone over half its total possible count, no pulse would have appeared at line 66 and flip flop 62 would have remained in the zero state where it had been set by the reset command line 70. In this state, a ground from 65 would appear at the zero terminal of flip flop 62 and would have been transmitted via line 60 to the early gate input side of the pulse train selector 56. Under this condition, the early pulse train would have been fed to the coarse counter 31. Thus, depending upon the count registered in the fine counter 29, either the early or late pulse train is selected to be fed to the coarse counter 31. At each start pulse in line 71 a pulse is generated by the pulse generator 84 which is of a width sufficient to remove the first pulse of the lag train by gating off pulse inverter 77. This is necessary to remove the ambiguity which exists in the V scan logic circuitry below the first two and 13/16 degrees of shaft revolution. (2 and 13/16 degrees is equivalent to 1 complete Inductosyn cycle.) Delay line 80 is provided to shift the coarse stop pulse in line 71 from synchronism with either the early or late pulse train. By adjusting the amount of this delay, the early pulse train is so arranged that consecutive pulses lie near the negative peak of the reference signal to the Inductosyn and therefore the late pulses lie near the positive peak of the reference signal to the Inductosyn. Thus the V scan switch point occurs midway between the early and late pulse train spacing. The coarse resolver 4 and the Inductosyn 1 are mechanically and electrically zeroed. Therefore, coarse and fine error null crossings will occur approximately in synchronism, within the accuracy of the coarse resolver 4. However, the fine error null crossing selects a train of pulses, through the V scan logic circuitry 11 which places the coarse stop pulse in a position so that it never can be synchronous with a pulse in the coarse early or late trains. Thus, the fine counter 29 or fine portion of the system removes the ambiguity which could possibly exist in the coarse count and automatically selects the pulse train which has the correct number of pulses for the coarse count. The coarse resolver 4 must have an accuracy sufficient to insure that the coarse stop pulse will lie within the V scan switch points. Since the V scan switch points occur essentially at the half way point in the Inductosyn cycle it is evident that the coarse resolver need only be accurate to one half of a complete Inductosyn cycle.

*Shaft position readout*

A shaft position readout is obtained in the following manner.

The reference square wave line 27, the error sine wave from the Inductosyn line 29 and the error sine wave from the resolver line 85 are always present at the respective null crossing detectors 79, 74, and 82 whenever excitation is being fed to the stator drivers 22, 23. Each time a null crossing occurs, a pulse is derived from the null crossing detectors 79, 74, and 82. The null crossing gates 28 and 57 are set in a state such that they do not accept the start pulses in line 71 or the stop pulses in lines 75 and 83 until a read command in line 70 is provided which puts them in the correct state. The null crossing gates 28 and 57 consist of flip flops with pulse inverters connected in such a manner that upon receiving a read command in line 70, the fine null crossing gate 28 will accept the next start pulse in line 71. At this start pulse, 8.192 megacycles pulses from the crystal clock 8 are transmitted via line 72 to the fine null crossing gate 28 and then via line 73 to the fine counter 29. The next fine stop pulse in line 75 derived from the Inductosyn error channel via line 69 and the fine null crossing detector 74 closes this gate and stops the fine counter. At the same time, this stop pulse in line 75 enables the coarse null crossing gate 57 via line 68 to accept the next delayed start pulse in line 81 from the reference square wave null crossing detector 79. This pulse in line 81 opens the coarse null crossing gate 57 allowing the appropriate pulse train in line 58 to be transmitted via line 289 to the coarse counter 31. The appropriate pulse in line 58 is either an early pulse train of 128 kc. from the input line 55 or a late train of pulses of the same frequency from the input line 54. The next coarse error null crossing in line 85 generates a stop pulse in the coarse null crossing detector 82 which is applied via line 83 to the coarse null crossing gate 57, thus blocking pulses to the coarse counter 31. This completes the count. Upon completion of the coarse count, the system is returned to the off state and will retain the count until a new read set command in line 70 is initiated. During the time interval between the last fine stop pulse and the next coarse start pulse the count in the fine counter 29 is applied via line 66 to the V scan circuitry portion 11 of the system as described previously. The fine counter 29 and the coarse counter 31 in FIG. 6 contain an appropriate number of flip flops to accumulate the fine coarse counts. The fine counter 29 must be capable of a total count of $2^{13}$ and therefore 13 flip flops are required for the fine count. When all 13 flip flops have transferred, the count is equal to one less than a full fine count. On the arrival of one more count in fine, all 13 of the flip flops will reset to zero, thereby providing a full count of $2^{13}$ or zero. Likewise, in the coarse counter 31 flip flops are provided for a count of $2^7$ or 128. When all 7 flip flops have gone to the one state, this is a count of one less than a total coarse count. One more pulse will reset all the flip flops to the zero state and again indicate zero or a full coarse count.

The binary output of the coarse and fine counters 29, 31 can be presented in a visual form if desired, as indicated at 86, or they can be used to drive a computer or similar equipment. Serial data output can be obtained by the addition of a shift register which is not shown on the block diagram.

*Tabulation*

The digital portion of the system is made up of standard commercially available logic packages. The units described in this system are those manufactured by Harvey Wells Electronics, Natick, Mass. The following tabulation refers to these units by the reference numbers as indicated in FIGS. 6 and 7 and the published reference equivalent in the Harvey Wells 1961 catalog.

| Units | Reference Number | Harvey Wells Catalog Description | Harvey Wells Catalog Model and No. Req. |
|---|---|---|---|
| Frequency Dividers | 9 | 4 stage counter 10MC | 1-1032 |
|  |  | 4 stage counter 5MC | 1-1031 |
| Frequency Dividers | 13 | 4 stage counter 1MC | 2-103 |
| Quadrature Generator | 15 | Flip Flop B | 2-1011 |
| Crystal Clock | 8 | Crystal Clock | 1-1412 |
|  |  | Flip Flop B 10MC | 2-1012 |
| Null Crossing Gates | 28, 57 | Flip Flop B 5MC | 2-1011 |
|  |  | Pulse Gate | 2-1101 |
| Fine Counter | 29 | 4 stage binary counter | 1-1032 |
|  |  |  | 2-1031 |
| Coarse Counter | 31 | do | 2-103 |
| Null Crossing Detectors | 79, 74, 82 | Pulse Standardizer | 3-1612 |
| Delay Line | 53 | Delay C | 1-1321 |
| Pulse Train Selector | 56 | Pulse Mixer | 1-1121 |
| Pulse Generator | 84 | Logic A | 1-1201 |
| Flip Flop | 33, 34, 62 | Flip Flop B | 3-1011 |
| Inverter | 35 to 38, 63, 64, 77 | Logic A | 7-1201 |

FIGS. 8 and 9

Referring to FIGS. 8 and 9, the circuits of FIG. 6 and 7 are extended to encode the sum or difference of the angular shaft positions of a plurality of shafts. This is illustrated as applied to three shafts, 87 and 88 in FIG. 8 and 89 in FIG. 9. Each of these shafts has a rotor like 105 of a one hundred twenty-eight speed Inductosyn 90, and the rotor of a one speed coarse resolver like 91, which are shown for shaft 87.

The Inductosyn 92 and coarse resolver 93 are provided for shaft 88 in FIG. 8, and the Inductosyn 94 and coarse resolver 95 are provided for shaft 89, in FIG. 9.

In FIGS. 8 and 9, the reference voltage for null crossing detector 96 as indicated by line 97, is taken from the 0° line at the output of the stator driver 98. The stator drivers 98 and 99 as previously described in connection with FIGS. 6 and 7, are driven by a phase shifter 100 having an input from a frequency divider 101, having an input from a crystal standard pulse generator 102. Phase shifter 100 can be a quadrature generator, like 15. The input to the stator drivers 98 and 99 is composed of square waves having a quadrature separation and the output of these drivers is applied to stator windings 103 and 104 which correspond to windings 6 and 7 in FIG. 6. The signal or error output from the rotor 105 of Inductosyn 90 appears in line 106 and is a constant amplitude one kilocycle sine wave, the phase of which varies as a function of the angular position of shaft 87, as described in connection with FIG. 6.

This signal in line 106 is an input to a phase shifter 107 which shifts its input into quadrature components which form inputs to the stator drivers 108 and 109 which supply inputs to the stator windings 110 and 111 of Inductosyn 92. The error signal in the rotor output line 112 from the rotor 113 for shaft 88 thus represents the sum or the difference of the angular positions of shafts 87 and 88.

The signal in line 112 is similarly an input to a phase shifter 114, FIG. 9, which divides its input into quadrature components which form inputs for the stator drivers 115 and 116, the latter providing inputs to the stator windings 117 and 118 of Inductosyn 94. Thus, the error signal in line 119 from the output of the rotor 120 of Inductosyn 94 represents the sum or difference of the angular positions of the three shafts 87, 88, and 89. From this point the operation is the same as described in connection with FIGS. 6 and 7, a start signal being derived from the null crossing detector 96, and a fine stop signal being derived from the null crossing detector 121 for controlling the fine null crossing gate 122. The stop signal from the coarse null crossing detector 123 and the start signal from the reference detector 96 are inputs to the course null crossing gate 124. The operation of the fine gate 122 and the coarse gate 124 are correlated and operate a counter 125 under control of a read command 126, as explained in connection with FIG. 6 and 7.

FIGS. 10 and 11

FIGS. 10 and 11 illustrate a simplification wherein the error amplifiers and filter in the block 30 in FIG. 6, also the filter and error amplifier in block 127, FIG. 6, are omitted and become unnecessary by the use of a 4 winding one speed coarse resolver 128 in FIG. 10 for shaft 129, and a similar 4 winding one speed coarse resolver 130 for shaft 131, also a 4 winding 128 speed Inductosyn 132, having 2 stator windings 133 and 134 on the stator 135 as above described, also 2 quadrature windings 136 and 137 on the rotor 138, with a similar 4 winding 128 speed Inductosyn 139 for shaft 131. In the 4 winding resolvers 128 and 130 and in the Inductosyns 132 and 139, the 2 input or stator coils are at right angles to each other, and the same is true of the rotor coils. The two inputs for each Inductosyn and resolver, which have a phase separation of 90°, thus appear in their respective outputs shifted in phase by an amount depending upon the position or displacement of the respective shafts 129 and 131.

The fine output from the rotor 153 of Inductosyn 139 in line 140 represents the fine component of the sum or difference of the angular positions of shafts 129 and 131, while the error output from the rotor of resolver 130 in line 141 represents the coarse component of the sum or difference of the angular position of those shafts. The output of windings 136, 137 drives the next data element 139, windings 136 and 137 providing the necessary quadrature signals. Thus, line 140, the output of the windings of rotor 153, in effect includes also the output of windings 136 and 137. The same holds true for coarse where the output of the rotor windings of resolver 130, in line 141, in effect includes also the output of the rotor windings of resolver 128, this combined output being used to excite the stator drivers at the input of resolver 149 associated with shaft 154. The signal in line 140 thus has quadrature components which are inputs to the stator drivers 142 and 143 in FIG. 11, these drivers forming an input for the stator 144 of Inductosyn 145. Inductosyn 145 and resolver 149 have rotors on shaft 154. The rotor 146 of Inductosyn 145 thus has an error signal in line 147 which represents the sum or difference of the angular position of the 3 shafts 129, 131, 154 in FIGS. 10 and 11. Similarly, the rotor 148 of the coarse resolver 149 has an error output in line 150 representing the sum or difference of the angular positions of those three shafts. The reference signal in line 151 for the null crossing detector 152 is obtained as described in connection with line 97, FIG. 9. The remainder of the circuit in FIGS. 10 and 11 is the same as previously described in connection with FIGS. 8 and 9, the fine null crossing detector 155 in FIG. 11 corresponding to 121, FIG. 9, the coarse null crossing detector 156 corresponding to 123, the fine null crossing gate 157 in FIG. 11, corresponding to 122 in FIG. 9, the coarse null crossing gate 158 in FIG. 11, corresponding to 124 in FIG. 9, and the block 159 in FIG. 11, representing a counter with coarse-fine correlation and corresponding to 125 in FIG. 9, a read command being provided as indicated at 201, FIG. 11.

FIGS. 12 and 13

These figures show a parallel arrangement for obtaining a count representing the sum or difference of the positions of two shafts 160 and 161 instead of the tandem arrangement of FIGS. 10 and 11. In FIGS. 12 and 13 the stator drivers 162 and 163, as before, have an input from phase shifter 164 which is supplied with an output from frequency divider 165, which has an input from pulse generator 166. Phase shifter 164, FIG. 12, is preferably a quadrature generator like 15, FIG 7. The stator drivers 162 and 163 have inputs in quadrature relation as indicated and they provide an input to the stator coils 167 and 168 of the one hundred twenty-eight speed Inductosyn 169. The lines 170 and 171 are in parallel with the stator windings 167 and 168, these lines supplying an input to the stator windings 172 and 173 of the one hundred twenty-eight speed Inductosyn 174, which has a rotor 175 on or driven by shaft 161, the Inductosyn 169 having a rotor which is on or driven by shaft 160. The output of rotor 176 which has amplifiers and filter as indicated, is connected to line 177 which is an input to the null crossing detector 178, while the output of rotor 175, in line 179 is an input to the null crossing detector 180. The signal in line 177 represents the angular position of shaft 160 and is used as a start signal, out of detector 178, for the null crossing gate 181, the stop signal for this gate being derived from null crossing detector 180, which has an input in line 179 which represents the angular position of shaft 161. The null crossing gate 181 controls the fine clock pulses in line 182 from the pulse generator 166 and supplies to the fine section of counter 183 of line 184 a number of pulses corresponding to the sum or difference of the angular positions of shafts 160 and 161. Similarly the input in lines 185 and 186 to the one speed coarse resolver 187 for shaft 161 are taken in parallel to the input 188, 189 to the one speed coarse resolver 190 for shaft 160, from the lines 191 and 192 from the output of stator drivers 162 and 163. The output of resolver 190 in line 193 is an input to the null crossing detector 194 having an output line 195 which supplies a start signal for the coarse null crossing gate 196. The stop signal for gate 196 is derived from null crossing detector 197 which has an input in line 198 from the output of resolver 187 for shaft 161. Gate 196 is supplied with coarse clock pulses in line 199 and supplies a number of pulses on line 200 to the counter 183 corresponding to the coarse ingredient of the sum or difference in the angular positions of shafts 160 and 161. The coarse enable line 202 in FIG. 13 corresponds to line 68 in FIG. 6, described in detail in connection with FIG. 16. Lines 68 and 202 transmit the fine stop pulse to enable the coarse null crossing gate only after completion of the fine count.

FIGS. 14 and 15

In FIG. 14, the Triple Linear Inductosyn 203 is disclosed and claimed in U.S. application S.N. 29,972, filed May 18, 1960, by Clair L. Farrand and Robert W. Tripp for Precision Transducers, assigned to assignee of the present patent application. The Inductosyn is basically described and claimed in U.S. Patent 2,799,835, July 16, 1957.

The Triple Inductosyn has two members relatively movable in a linear direction, one member here shown as the stator 204, is a unitary member having a base of metal such as ferrous material, having thereon three sets of stator windings, namely fine, medium, and coarse sets, indicated at 205, 206, and 207, each set including two stator windings like 208, 209, having conductors in space quadrature of the pole cycle of their associated relatively movable winding, like 210, the fine, medium, and coarse movable windings 210, 211, and 212 being in inductive relation with the windings of their respective stator winding, and all movable windings being mounted on a common support, which may also be of metal or ferrous material. The windings 210 to 212 as a unit are linearly movable, being driven by the linear mechanical analog input, as indicated by the arrow line 213. The output of the scale or movable windings 210, 211, and 212 thus represents, respectively, the fine, medium, and coarse components of the position of the drive indicated at 213, these outputs each having amplifiers and filters as indicated by the blocks 214, 215, and 216.

The stators 205 to 207 are connected in series to the stator drivers 217 and 218 which have 10 kc. quadrature inputs on lines 219, 220 from the filters 221 and 222, having inputs from the quadrature generator 223, having a 40 kc. input from frequency divider 224, the latter having an input from the frequency dividers 225 and 226, fed by the 10 mc. crystal clock 227. Fine, medium, and coarse stop signals, 10 kc., appear in lines 228, 229, and 230 in the output of the respective windings 210, 211, and 212, these signals being supplied to the respective fine, medium, and coarse null crossing detectors 231, 232, and 233. The reference null crossing detector 234 has a 10 kc. input in line 235 from the quadrature generator 223.

In FIG. 14, the delay line 236 has a delay of 0.25 μsec., and corresponds to the delay line 80 in FIG. 6. This delay line has an output line 237 which is connected by line 238 to the medium null crossing gate 239 and by line 240, to the coarse null crossing gate 241, also by line 242 to the pulse generator 243 in the V scan logic circuit indicated at 244, also by line 245 to the pulse generator 246 in the V scan logic circuit indicated at 247. The item 244 includes a pulse train selector 248 which has a 1 mc. output on line 249 of either an early train from line 250 or a late train from line 251, the late train having a delay of 0.5 μsec. The item 247 includes a pulse train selector 252 which has a 400 kc. output on line 253 of either an early train from line 254, or a late train from line 255, the late train having a delay of 1.25 μsec.

The medium enable control in line 256 enables gate 239 only after a fine count is completed, as explained in detail in connection with FIG. 16. The fine gate 257 has an input of 10 mc. on line 258, also start and stop controls from null crossing detectors 234 and 231, and a fine counter 259. The medium gate 239 has a 1 mc. input 260, and start and stop inputs from line 238 and null crossing detector 232, with an output to the medium counter 261. The coarse gate 241 has 400 kc. input on line 262, also start and stop inputs from 234 via 237 and 240, and from null crossing detector 233, with an output on line 263 to the coarse counter 264. The early or late train is supplied to the medium gate 239 depending upon whether the fine counter 259 has gone over half of its count. Also, the early or late train is supplied to gate 241 depending upon whether the medium counter 261 has gone over half of its count, the coarse enable 265 similarly enabling the coarse gate 241 only after the medium null crossing gate 239 has completed its count. These operations, including the whole matter of coarse-fine correlation, will be apparent from the operations described in connection with FIGS. 6 and 7, also FIG. 16.

The fine, medium, and coarse counters 259, 261, and 264 thus provide coarse, medium, and fine counts of the linear position of the slider or movable member on which the windings 210, 211, and 212 are arranged.

As disclosed and claimed in S.N. 29,972, the fine windings 208, 209 and 210 may each have active conductor portions extending at right angles to the direction of relative movement while stator or scale of the medium and coarse windings 206 and 207 may extend at an acute angle to said direction, the windings 211 and 212 extending parallel to said direction. The pole cycle of the fine, medium, and coarse data elements as indicated in FIG. 14, may be .1 inch, 10 inches, and 400 inches respectively.

FIG. 16 coarse enable

FIG. 16 is a schematic circuit drawing of the fine null crossing gate 268 like 28 in FIG. 6, the coarse null crossing gate 269 like 57 in FIG. 6 and the coarse enable control 270 which is schematically indicated by the following, line 68, FIG. 6; 266 FIG. 9; 267 FIG. 11; 202 FIG. 13; the medium enable control 256 FIG. 14; the coarse enable control 265 FIG. 14.

The fine gate 268 includes flip flops FF1 and FF2 and gate 269 includes flip flops FF3 and FF4. Fine gate 268 also includes pulse gates PG1 and PG2, also pulse inverters as indicated. Coarse gate 269 also includes pulse gate PG3 and pulse inverters as indicated.

When a flip flop is in the one state, its one terminal is at ground and its zero terminal is at −4 volts. When it is in the zero state, its zero terminal is at ground and its one terminal is at −4 volts.

An inverter like 273, and 276 to 278, 281, 282, behaves very much like a pulse gate. A ground at the inverter enables the inverter to invert a level of ground or −4 volts at its input terminal.

The reset pulse on line 271 which corresponds to line 70, FIG. 6, sets FF1 in the one state and FF2 in the zero state, thereby placing a ground which appears at the flip flop output terminals at the one terminal of FF1 and a ground at the zero terminal of FF2. The next start pulse from line 272 transmitted through inverter 276 to the zero side of FF1 sets it in a zero state, thereby allowing clock pulses from line 274 to flow via pulse gate PG1 to the fine counter via line 275. This is due to the fact that the zero terminal of FF1 transferred to ground on receipt of the start pulse, line 272, via inverter 276 to zero terminal of FF1. The ground which thus appears at the zero terminal of FF1 enables pulse gate PG1 to transmit clock pulses from line 274 to the fine counter.

A pulse gate inhibits the flow of pulses when its gate terminal is at −4 volts and transmits pulses when its gate terminal is at ground. Actually, the pulse gate contains a transistor whose emitter is connected to the gate input terminal. The −4 volt level at the emitter shuts the transistor off and the ground turns it on.

The ground at the zero terminal of FF1 is transmitted to the inverter 273. This enables the next fine stop pulse, line 280, to set FF2 in the one state and provide a ground at its one output terminal. The ground at the one output terminal of FF2 is transmitted to the inverter 277. This enables the next clock pulse after the fine stop pulse to transfer FF1 to the ground state, thereby providing a −4 volt signal at its zero terminal, closing the pulse gate PG1 for the fine counter.

During the fine counting interval, the one terminal of FF1 was at −4 volts. This −4 volt level at the one terminal of FF1, via line 284, is inverted to ground by the inverter 278. This ground is transmitted to pulse gate PG2 via line 279. PG2 is thereby enabled to transfer the fine stop pulse, line 280, before transferral of FF1. The output of PG2, which is the fine stop pulse from line 280, is labeled coarse enable 270, and sets FF4 in the zero state via the inverter 281.

The next start pulse from line 272 is transferred via inverter 282 to FF3 zero terminal, thereby setting FF3 in the zero state and thus enabling PG3 to transmit the 128 kc. pulse train, line 283, to the coarse counter 287. The ground at FF3 zero terminal is transmitted to inverter 285. This enables the next coarse stop pulse, line 286, to set FF3 and FF4 in the one state, thereby stopping the flow of pulses to the coarse counter, completing this cycle.

During the wait period between reset commands, line 271, flip flops FF3 and FF4 remain in the one state, thereby prohibiting start or stop pulses from initiating a coarse count. Also, FF1 and FF2 remain in the one state, thereby prohibiting a fine count. Thus, to enable the coarse gate 269, it is necessary that a reset command, line 271, initiate a count and the state of FF1 enable PG2 to pass a fine stop pulse, line 280.

Inverter 288 inverts the negative stop pulse on line 286 to a positive pulse. This latter pulse transfers FF3 to the 1 state, thereby stopping the coarse count.

All of the flip flops FF1 to FF4 have two input terminals and two output terminals. However, the logic does not always require the use of all terminals, although they are available. FF3 and FF4 have output terminals on the one side that are not needed to perform the required function.

The Harvey Wells equipment used here and those of most manufacturers of digital logic equipment presently use transistor circuitry to perform the logic functions of vacuum tube bistable circuits represented by the flip flops FF1 to FF4.

It will be understood that both MC and mc. represent megacycles or one million cycles per second.

It should be noted that "ground" and −4 volts are logic levels of a particular supplier of digital equipment. Other digital systems using different logic levels can be used to supply the same function.

We claim:

1. An analog-digital converter comprising fine and coarse position measuring transformers each having
(a) relatively stationary and movable transformer members,
(b) a mechanical analog input for said movable members,
(c) fine and coarse null crossing detectors and
(d) fine and coarse gates controlled thereby,
(e) said fine and coarse gates respectively controlling inputs to fine and coarse counters,
(f) said fine and coarse detectors having inputs respectively from
(g) the signal outputs of said fine and coarse movable members,
(h) said signal outputs acting as stop signals for said gates respectively,
(i) a clock pulse generator,
(j) and separate means for deriving from said generator
  (1) a polyphase input for said relatively stationary transformer members, said polyphase input having time phase different in polyphase windings of said last mentioned transformer members,
  (2) a reference start signal for said gates,
  (3) fine and coarse pulses controlled by said fine and coarse gates respectively,
(k) said gates having an output of a number of pulses representing the position of said mechanical analog input.

2. An analog-digital converter according to claim 1,
(a) said coarse pulses derived from said clock pulse generator and controlled by said coarse gate comprising early and late trains of pulses,
(b) switching means for supplying one or the other of said trains to said coarse counter depending on the extent of count in said fine counter,
(c) and means for blocking said coarse counter until said fine counter completes its count.

3. An analog-digital converter according to claim 1,
(a) said coarse pulses derived from said clock pulse generator and controlled by said coarse gate comprising early and late trains of pulses,
(b) switching means for supplying one or the other of said trains to said coarse counter depending on the extent of count in said fine counter,
(c) and means for blocking said coarse counter until said fine counter completes its count,
(d) said switching means acting to transmit said early pulse train to said coarse counter if said fine counter has not gone over half its total possible count, said switching means acting to transmit said late pulse train to said coarse counter if said fine counter has gone over half its total possible count.

4. An analog-digital converter according to claim 1,
(a) said coarse pulses derived from said clock pulse generator and controlled by said coarse gate comprising early and late trains of pulses,
(b) switching means for supplying one or the other of said trains to said coarse counter depending on the extent of count in said fine counter,
(c) and means for blocking said coarse counter until said fine counter completes its count,
(d) said switching means acting to transmit said early pulse train to said coarse counter if said fine counter has not gone over half its total possible count, said switching means acting to transmit said late pulse train to said coarse counter if said fine counter has gone over half its total possible count,
(e) and means for establishing the switching point of said switching means out of synchronism with both said early and late pulse trains.

5. An analog-digital converter according to claim 1, wherein
(a) said mechanical analog input is a rotary shaft, said coarse and fine transformer member comprising rotary transformer members mounted on said shaft,
(b) another shaft having thereon coarse and fine movable members of another position measuring transformer and
(c) means for combining the signal outputs of the coarse and also the fine movable members to form the coarse and fine stop signals for said fine and coarse gates respectively,
(d) said counters supplying a pulse count representing the sum or difference of the angular positions of said shafts, 6. An analog-digital converter according to claim 1, wherein said mechanical analog input has a linear movement.

7. An analog-digital converter according to claim 1, wherein said mechanical analog input has a linear movement,
  (a) said fine and coarse relatively stationary members comprising windings on one support,
  (b) said relatively movable members comprising windings on another support movable linearly with respect to said first mentioned support.

8. An analog-digital converter comprising
  (a) a position measuring transformer having
    (1) a variable mechanical analog input and
    (2) relatively movable members,
    (3) one of said members having polyphase windings,
    (4) another of said members having a single phase winding for supplying a phase-sensitive relative position signal;
  (b) a clock pulse generator supplying pulses to
  (c) a frequency divider having an output of
    (1) sub-harmonic frequency as an input to
  (d) a polyphase generator having as outputs
    (1) polyphase signals with time phase different for inputs to said polyphase windings and
    (2) a reference signal as an input to
  (e) a first null crossing detector having an output of
    (1) a first control signal;
  (f) a second null crossing detector having an input of
    (1) said phase-sensitive relative position signal and an output of
    (2) a second control signal;
  (g) a gate having inputs of
    (1) said clock pulses,
    (2) said first control signal and
    (3) said second control signal, and having an output of
    (4) a number of clock pulses representing a digital number corresponding to the time difference between the first control signal and the second control signal.

9. An analog-digital converter comprising:
  (a) a first position measuring transformer having
    (1) a variable mechanical analog input and
    (2) relatively movable members,
    (3) one of said members having polyphase windings,
    (4) another of said memberes having a single phase winding for supplying a first phase sensitive relative position signal;
  (b) a second position measuring transformer having
    (1) said mechanical analog input and
    (2) relatively movable members,
    (3) the first of said last mentioned members having polyphase windings,
    (4) the second of said last mentioned members having a single phase winding for supplying a second phase sensitive relative position signal; the change in phase of said first phase sensitive signal for a given change in said analog input being an integral multiple of the change in phase of the said second phase sensitive signal produced by the same change in said analog input;
  (c) a clock pulse generator supplying pulses to
  (d) a frequency divider having an output of
    (1) sub-harmonic frequency as an input to
  (e) a polyphase generator having as outputs
    (1) polyphase signals for inputs to said first polyphase windings,
    (2) polyphase signals for inputs to said second polyphase windings and
    (3) a reference signal as an input to
  (f) a first null crossing detector having an output of a
    (1) first control signal;
  (g) a second null crossing detector having an input of
    (1) said first phase sensitive relative position signal and an output of
    (2) a second control signal;
  (h) a third null crossing detector having an input of
    (1) said second phase sensitive relative position signal and an output of
    (2) a third control signal;
  (i) a first gate having inputs of
    (1) said clock pulses,
    (2) said first control signal and
    (3) said second control signal, and having an output of
    (4) a first number of clock pulses representing a first digital number corresponding to the time difference between the first control signal and the second control signal,
  (j) a switch having inputs of
    (1) an early train of clock pulses,
    (2) a later train of clock pulses,
    (3) a signal proportional to said first digital number, and having an output of
    (4) said early train of clock pulses when said first digital number is less than half of the range of said first digital number, or
    (5) said later train of clock pulses when said first digital number is greater than half of said range of said first digital number,
  (k) a second gate having inputs of
    (1) said early train or said late train of said clock pulses,
    (2) said first control signal and
    (3) said third control signal, and having an output of
    (4) a second number of clock pulses representing a second digital number corresponding to the time difference between the first control signal and the third control signal,
    (5) a full range of said first digital number being equivalent to one count of said second digital number.

10. An analog-digital converter comprising
  (a) a position measuring transformer having members relatively movable in a linear direction,
  (b) a polyphase input with time phase different in polyphase windings for one of said members,
  (c) a drive for linear movement of said movable member,
  (d) the other of said members having a single phase winding having an output, having a voltage signal to be digitized and representing the linear position of said movable member,
  (e) means supplying a reference input signal,
  (f) the phase difference between said reference signal and said output signal being a measure of the linear position of said movable member, and
  (g) means for converting said phase difference to a digital output.

11. An analog-digital converter comprising
  (a) a position measuring transformer having members of different grades of sensitivity, namely coarse, medium and fine, said members being relatively movable in a linear direction,
  (b) a polyphase input with time phase different in polyphase windings for one member of each grade,
  (c) a drive for linear movement of the movable member of each grade,
  (d) the other member of each grade having a single phase winding having an output signal to be digitized and representing the linear position of said movable member of each grade,
  (e) means supplying a reference input signal,
  (f) the phase difference between said reference signal and said output signal being a measure of the linear position of said movable member of each grade, and
(g) means for converting said phase difference to a digital output.

12. An analog-digital converter comprising fine and coarse position measuring transformers each having
   (a) relatively stationary and movable transformer members,
   (b) a mechanical analog input for said movable members,
   (c) fine and coarse null crossing detectors and
   (d) fine and coarse gates controlled thereby,
   (e) said fine and coarse gates respectively controlling inputs to fine and coarse counters,
   (f) said fine and coarse detectors having inputs respectively from
   (g) the signal outputs of said fine and coarse movable members,
   (h) said signal outputs acting as stop signals for said gates respectively,
   (i) means providing
      (1) a polyphase input for said relatively stationary transformer members, said polyphase input having time phase different in polyphase windings of said last mentioned transformer members,
      (2) a reference start signal for said gates,
      (3) fine and coarse pulses controlled by said fine and coarse gates respectively,
   (j) said gates having an output of a number of pulses representing the position of said mechanical analog input.

13. An analog-digital converter according to claim 12, said mechanical analog input including means for driving both the coarse and fine movable transformer members at the same speed, said coarse stationary transformer having a certain number of poles and said fine stationary transformer having a larger number of poles.

References Cited by the Examiner
UNITED STATES PATENTS

| | | | |
|---|---|---|---|
| 2,991,462 | 7/61 | Hose | 235—154 |
| 3,023,959 | 3/62 | Rabin | 235—154 |

MALCOLM A. MORRISON, *Primary Examiner.*